United States Patent [19]

Thomason

[11] 3,759,388
[45] Sept. 18, 1973

[54] FILTERING SYSTEM FOR DEEP FAT COOKING VESSEL

[76] Inventor: Gary Thomason, 13530 S.W. Aragon St., Beaverton, Oreg. 97005

[22] Filed: Sept. 8, 1971

[21] Appl. No.: 178,736

[52] U.S. Cl............. 210/167, 210/DIG. 8, 210/195
[51] Int. Cl............................................. B01d 29/24
[58] Field of Search..................... 210/167, DIG. 8, 210/438, 439, 443, 497.1, 195; 99/377

[56] References Cited
UNITED STATES PATENTS

| | | | |
|---|---|---|---|
| 3,280,722 | 10/1966 | Rahauser | 210/DIG. 8 |
| 3,481,478 | 12/1969 | Williams | 210/443 X |
| 3,624,779 | 11/1971 | Miller, Jr. | 210/497.1 |
| 2,425,848 | 8/1947 | Vawter | 210/167 |
| 3,526,590 | 9/1970 | Russo | 210/439 |
| 2,661,846 | 12/1953 | Lash et al. | 210/439 |
| 2,546,163 | 3/1951 | McBeth | 210/DIG. 8 |

Primary Examiner—Samih N. Zaharna
Assistant Examiner—T. A. Granger
Attorney—Stephen W. Blore et al.

[57] ABSTRACT

A filtering system for deep fat fryers includes first and second stage filters and a low pressure pump having a bypass device for restricting the pressure to a given maximum value. Hot cooking oil is continuously passed through a first stage filter, wherein particles above 100 microns in size are removed, after which the cooking oil is passed through a second stage filter wherein particles above seven one-hundredths of a micron in size are removed. The media in the second stage filter comprises thin, fibrous paper material presenting interlocking fibers between layers in a multilayer roll, with the hot cooking oil being pumped axially through such roll.

10 Claims, 6 Drawing Figures

INVENTOR
GARY THOMASON
BY
BUCKHORN, BLORE, KLARQUIST & SPARKMAN
ATTORNEYS

INVENTOR.
GARY THOMASON
BY
BUCKHORN, BLORE, KLARQUIST & SPARKMAN
ATTORNEYS

FILTERING SYSTEM FOR DEEP FAT COOKING VESSEL

BACKGROUND OF THE INVENTION

This invention relates to a filtering system for a cooking vessel and particularly to a filtering system for removing exceedingly small particles from heated cooking oil on a continuous basis.

Many restaurants employ deep fat fryers wherein the heated cooking oil is maintained at a high temperature for an extended period of time in which food articles, usually having some kind of batter or coating applied thereto, are cooked in fairly large quantities in the same heated oil. When oil of this type is continuously used, foreign matter retained in the oil, e.g. some of the batter or coating applied to the food articles, will rapidly carbonize or char. These overheated materials accelerate rapid breakdown and cause hydrolysis oxidation and polymerization of the fat. Visible signs of excessive foreign matter will soon appear as, for instance, the absorbed food particles smoke or carbonize at a temperature lower than the smoke or flash point expected of the cooking oil or fat. Uneven browning of food and flavor and odor transfer occur, and the final result is the carbonizing, foaming and rancidness of the fat.

If the cooking oil in a particular vessel has been used for an entire day, it is usually necessary that the oil be filtered or replaced. This is, of course, a time consuming, and also somewhat dangerous operation considering the high temperature to which the oil is usually heated. Customarily, the oil is removed from the deep fat cooking vessel and slowly passed through a filtering media such as diatomaceous earth to remove undesired particles. Unfortunately, the use of diatomaceous earth, while removing some particles, increases the content of the diatomaceous earth itself in the cooking oil. Various other straining means have been used for filtering oil removed from a cooking vessel such as conventional pleated paper cartridges, cloth bags, and the like. However, these methods do not really result in removing particles from the food as bring about the undesirable flavor qualities and rancidness of the fat, after a few days' use, because smaller particles are not removed. In general, about 3 days' use can be expected of a given quantity of cooking oil operated substantially continuously at high temperatures, and after such time the oil is ordinarily discarded which, of course, represents a major expense in the case of many restaurant operations.

Many attempts have been made heretofore at continuous filtering of cooking oil by continuously withdrawing cooking oil from the vat or vessel, filtering the same, and returning the same to the cooking vessel. Unfortunately, such methods have not been practical because of limited filtering accomplished. In general, pleated cartridges or the like have been employed where the cooking oil essentially passes perpendicularly through a sheet of filter material. Various strainers or similar devices have been utilized on a continuous basis in an effort to remove some foreign material from the oil. Unfortunately, none of these expedients have resulted in the removal of sufficiently fine particles from the oil to extend the life of the oil materially beyond the limits mentioned above.

SUMMARY OF THE INVENTION

In accordance with the present invention, high temperature cooking oil from the deep fat cooking vessel is passed through first and second filter stages by a pumping means adapted to operate at low pressures, while continuously circulating the cooking oil from the cooking vessel through the first and second filter stages and back to the cooking vessel. The first filter stage is adapted for removing food particles down to a given size, e.g., particles of 100 microns and greater in size. In a particular embodiment, this first stage filter comprises a honeycomb wound filament providing a gradually tighter weave from one surface thereof to the other, forming pockets to trap particles of greater than a given size.

The second filter stage comprises a filtering media in the form of a thin, fibrous paper material presenting interlocking fibers between layers in a multilayer roll. The hot cooking oil is passed longitudinally through the roll, i.e., substantially along the layers, through the fibers extending between layers, by means of which particles of extremely small size are removed. According to tests, the second stage of filtering, following the first stage, removes particles of greater size than seven-hundredths of a micron. Removal of particles of this size acts substantially to clarify the cooking oils, and materially extends the life thereof beyond that heretofore thought possible. In some cases, cooking oil life has been extended almost indefinitely.

Removal of particles of such small size from cooking oil was not heretofore thought possible. Moreover, an additional unexpected result has been achieved in that the filtering system according to the present invention, according to tests performed therewith, has increased the percentage of polyunsaturates in the cooking oil. Consequently, a considerable advantage is provided by restaurants employing this system, not only in regard to the continuous purity of the cooking oils employed, but also in regard to the more healthful attributes of the foods prepared therewith.

Accordingly it is an object of the present invention to provide an improved filtering system for cooking oil wherein particles of extremely small size are removed from the cooking oil.

It is a further object of the present invention to provide an improved continuous filtering system for cooking oils and the like adapting the cooking oils for an extended cooking life.

It is further an object of the present invention to provide an improved filtering system for cooking oils and the like for increasing the percentage of the polyunsaturates in such oil.

It is a further object of the present invention to provide improved means for removing very small, substantially dissolved or suspended particles from a liquid medium.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

DETAILED DESCRIPTION

Figure 1:
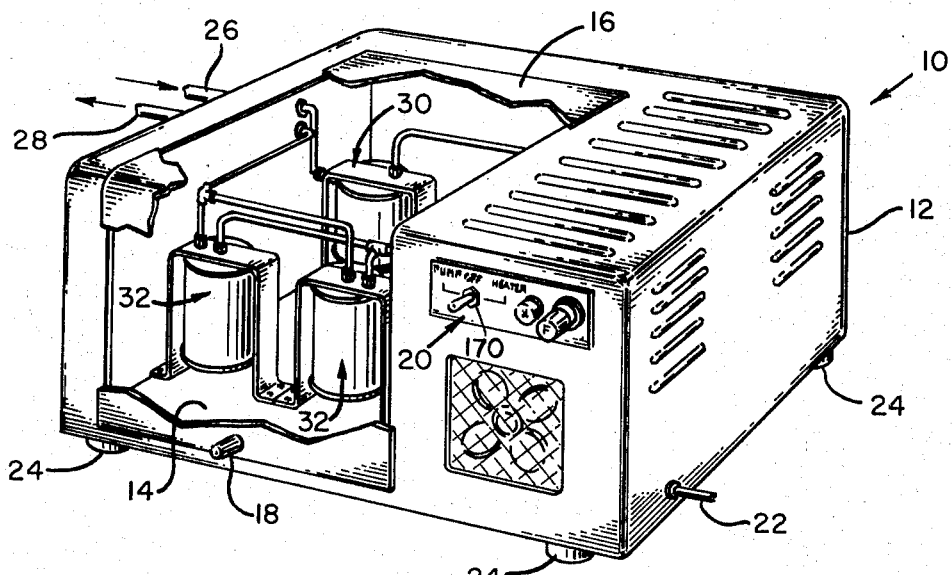
FIG. 1 is a perspective view of a filtering system according to the present invention.
Figure 2:
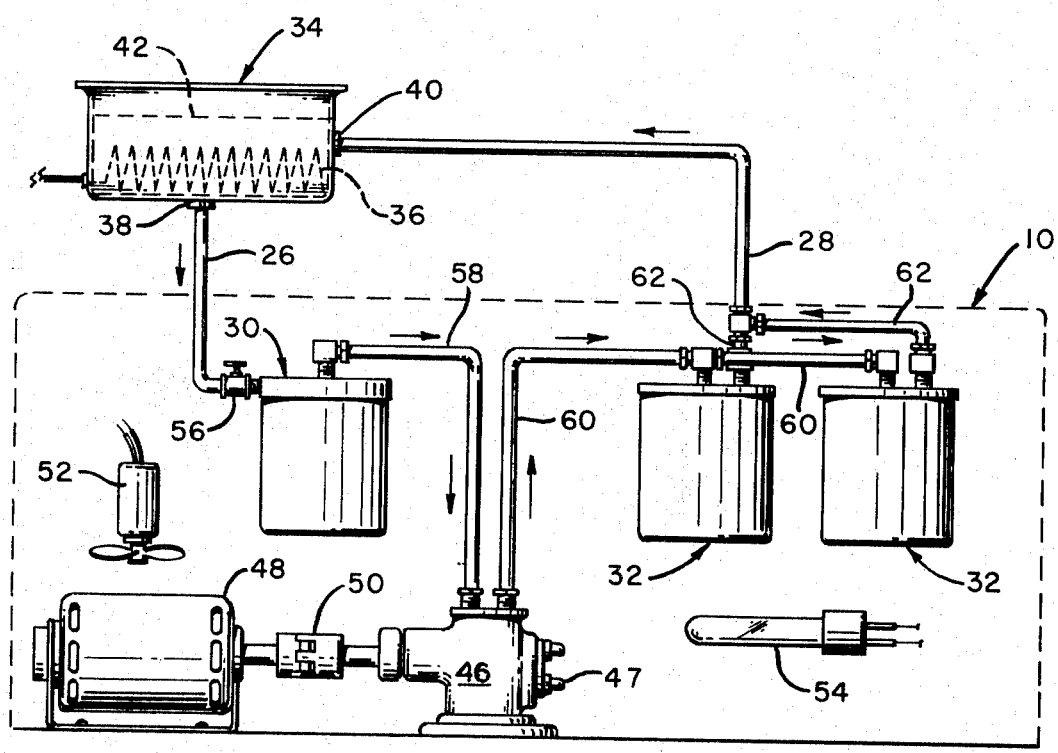
FIG. 2 is a broken away schematic view of a filtering system according to the present invention, as connected with a cooking vessel.

Referring to the drawings and particularly to FIGS. 1 and 2, a filtering system generally indicated at 10 is employed for continuously filtering hot cooking oil 42 used in a deep fat cooking tank 34. The tank 34 is provided with a submersible cooking element 36 which elevates the cooking oil to a temperature in the neighborhood of 375°. The tank 34 is provided with an outlet connection 38 suitably centrally located in its bottom wall to which outlet line 26 is connected for continuously draining cooking oil from the tank into filtering system 10. Similarly, an inlet line 28 returns oil from filtering system 10 to the tank 34 via inlet connection 40 suitably located just below the top surface of cooking oil 42.

In the filtering system 10, line 26 supplies cooking oil from tank 34 to a first stage filter 30 by way of a shutoff valve 56. This first stage filter 30 suitably comprises a prefilter sump, as hereinafter more fully described, for filtering and collecting larger particles from the cooking oil. The output from first stage filter 30 passes via line 58 to high temperature mechanical seal pump 46. The particular pump employed operates at 1,725 rpm driven by a motor 48 through insulating coupling 50. A suitable pump is a Model FH32 pump manufactured by Viking Pump, Cedar Falls, Iowa. This type of pump includes a bypass or pressure relief valve 47 which suitably operates at a pressure of 25 p.s.i. whereby the pump will not provide a higher pressure. This relief valve bypasses liquid from the discharge back to the suction side of the pump for preventing the building up of more than the desired pressure in the discharge line. In the particular embodiment constructed, the inlet of the pump was restricted for pumping 2½ gallons a minute in the particular case of a 2½ gallon tank 34.

The cooking oil, by the time it reaches pump 46, will have cooled somewhat in lines 26 and 58 as well as in first stage filter 30, so that the oil reaching the pump has the temperature of approximately 355°. A fan 52 is employed both for cooling motor 58 and first stage filter 30 for assisting a drop in temperature. The temperature of the oil in outlet line 60 from the pump will be approximately 350° to 355°F.

Pump outlet line 60 connects in parallel to a pair of second stage filters 32 which provide filtered oil at outlet line 62 to inlet line 28 leading to tank 34. As hereinafter more fully described, the second stage filters 32 employ a media or element for removing very fine particles and contaminants from the cooking oil down to seven one-hundredths of a micron, leaving a substantially pure and renovated oil for return to the cooking tank.

The filtering system is suitably housed in a cabinet 12 having a raisable cover 16 secured by latch 18, this cabinet being supported on rubber feet 24 at the location near the cooking tank so that connection may be made thereto by means of inlet and outlet lines 28 and 26. These lines and other lines connecting between filters and pump are desirably formed of high temperature Teflon with stainless steel braided jacket. The first and second stage filters are mounted upon a base 14 within the cabinet on brackets in such a way that these filters can be disengaged and removed for replacement, each filter having a threadable connection with the support as hereinafter more fully described. A heating element suitably taking the form of an incandescent lighting tube 54 is located within the cabinet in the vicinity of the filters for the purpose of maintaining a minimum temperature within the cabinet. Thus, in a particular instance, the lighting tube 54 is operated at times when the filtering system is not withdrawing heated oil from the tank 34, and at such times maintains the filter temperatures at approximately 120° to 150° F. Some types of cooking oil solidify below these temperatures and it is, of course, desirable to prevent solidification of oils within the filtering elements and the lines connected thereto. The cabinet 12 also includes a control panel 20, mounted on the front of the cabinet, having a switch 170, for operating either pump 46 or the tube 54. Electrical power is provided to the cabinet with conductor means 22.

Figure 3:
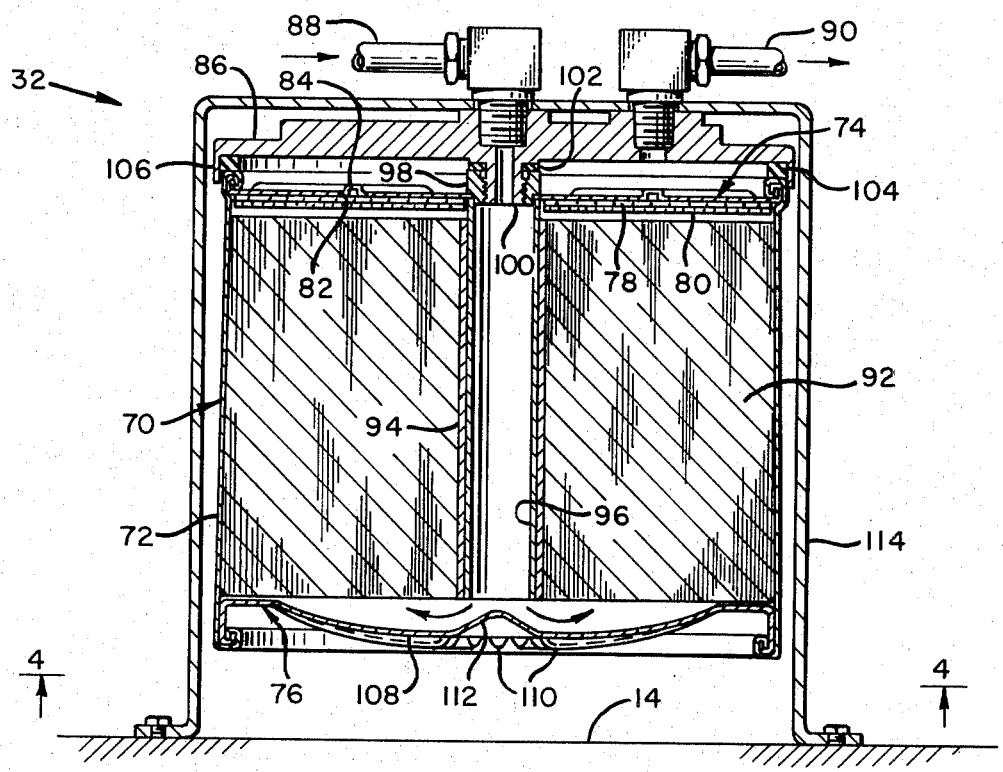
FIG. 3 is a vertical cross section of a second stage filtering device according to the present invention.
Figure 4:
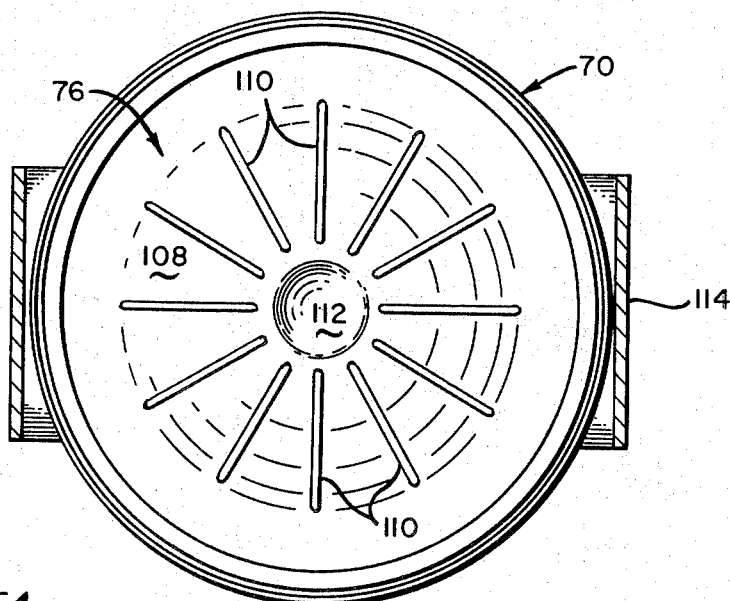
FIG. 4 is an underneath view of the FIG. 3 device taken at 4—4 in FIG. 3.

Referring to FIGS. 3 and 4, illustrating a preferred form of second stage filter according to the present invention, such filter 32 is supported upon a bracket 114 above the base 14 of the filtering system cabinet. The support includes as an integral part thereof a cast metal manifold 86 through which inlet connection 88 and outlet connection 90 are made in a conventional manner. The manifold has a lower circular opening defined by a retaining flange 106 within which an outer gasket 104 is secured for receiving cylindrical can 70 which may be formed of tin-coated steel or aluminum. The crimped top ridge of sidewall 72 of the can, where it joins top 74, is held against outer gasket 104 in sealing, abutting relation by means of a threaded bushing 98 attached to can top 74 and threadably received upon nipple 100 extending downwardly from manifold 86. An inner gasket 102 is located around the outside of the threaded nipple 100. The can 70 is thus secured against inner gasket 102 and outer gasket 104 by threadably engaging bushing 98 with nipple 100 and rotating the can until sealing engagement is made with both inner and outer seals. Extending downwardly from threaded bushing 98 is a central metal tube 96 which provides a conduit for oil flowing from inlet 88 and through nipple 100 into the filter. When the oil passes downwardly through central tube 96, it strikes center cone 112 which extends upwardly from domed portion 108 of can bottom 76 forming a splash plate for guaranteeing travel of the oil along the full radius of the can toward the outside of filter media 92. The rounded outwardly domed portion 108 is provided with a plurality of flutes or flow channels 110 which are radial depressions in the bottom thereof for assisting this radial travel of the oil.

The filter media or element 92 comprises a multilayer roll of thin fibrous paper material, fairly tightly wound, presenting interlocking fibers between layers in the multilayer roll. For instance, such paper may comprise soft, thin, slack-sized paper material generally made from pulp having short fibers, e.g., the material may be treated in a manner for cutting fibers and/or made from hard wood. Sulphite pulp may be used. A strong caustic extraction may be employed for softening. In any case, the finished paper is preferably loose and thin having a surface with many upstanding fibers. A cardboard center tube 94 closely received on tube 96 may be employed, but a metal tube 94 is preferred for temperature resistance and likewise the paper is desirably temperature resistant. When tube 94 is metal it can be considered as substantially forming a portion or extension of tube 96 to the extent of comprising a single tube. The filter media 90 completely fills the can 72, and the can 72 preferably tapers inwardly from the bottom to the top thereof so as to compress the filter media 92 at the upper part of the can.

The oil has a tendency to move or compact the filter media upwardly. For this reason, as well as for preventing paper migration in the oil, filter screens 78 and 80 are located at the top of the can just below the can top wall 74. The upper screen 78 is suitably 3/16 inch mesh, while the lower screen 80 suitably has 100 squares per inch.

On the upper side of the screens 78 and 80, the can top 74 is provided with radial and circumferential flow channels or flutes which are depressed upwardly in the can lid. These flutes are also provided with a multiplicity of perforations through which the oil exits from the can and into the region of manifold 86 inside outer gasket 104 toward outlet line 90. As hereinafter more fully discussed, it has been discovered that the output of filter 32 in the present system, i.e., employed in conjunction with the prefilter sump, will provide continuous filtering of particles above seven one-hundreths of a micron. Filtering of this thoroughness removes substantially all objectionable contaminants from the cooking oil whereby the cooking oil can be employed several times as long as heretofore thought possible.

Figure 5:
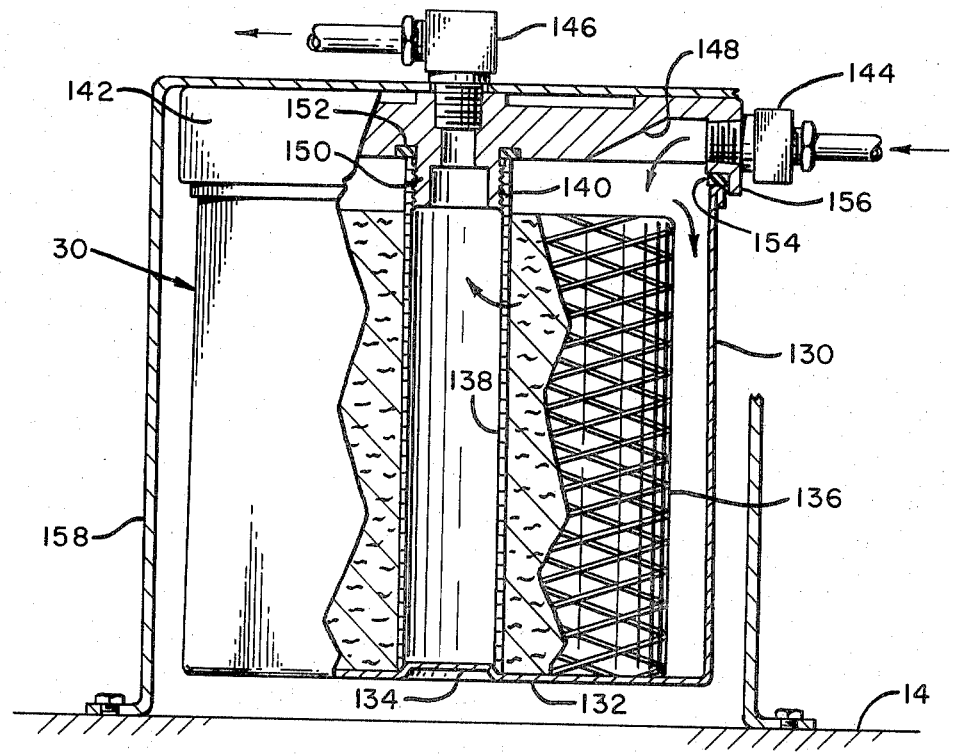
FIG. 5 is a partially broken away view of a first stage filtering device according to the present invention.

Referring now to FIG. 5, illustrating the prefilter sump according to the present invention, the bracket 158 for supporting the device extends upwardly from cabinet base 14 where it is joined to cast metal manifold 142 providing inlet and outlet passages for the filter. An inlet connection 144 is disposed in the side edge of the manifold 142, with the oil being directed therethrough against angular deflection surface 148 in the manifold, and downwardly toward filter element 136. The manifold is also provided with a retaining flange 156 defining a central opening inside of which an outer gasket 154 is secured. A tin-coated steel or aluminum can 130 having a folded over top open edge is compressed against outer gasket 154 as threaded portion 140 of a perforated center tube 138 engages nipple 150 extending downwardly from manifold 142. An inner gasket 152 is disposed around the nipple 150 against which threaded portion 140 makes sealing connection. The center tube forms the outlet path for oil passing through filter media 136, with the oil flowing generally upwardly in tube 138 and through the central bore of nipple 150 to outlet connection 146. The perforated tube 138 is secured to can bottom 132 and is centered upon a centering ring or dimple 134 in the bottom of the can.

The media 136 for the prefilter sump comprises a nylon filament or cord of about one sixty-fourth inch in diameter which is loosely spun to present a very fibrous or fuzzy surface, i.e. with a multiplicity of filaments extending radially outwardly therefrom. A filter of this general type is known as a Ful-flo filter of the honeycomb filter tube type manufactured by Commercial Filters Corporation, Lebanon, Indiana. The particular filter herein described is much more tightly wound at the interior, i.e. at center tube 138 to present orifices on the order of 100 microns in diameter. The cord is bobbin wound producing an overlapping weave having a diamond appearance, and which is looser or more open toward its outer periphery of media 136 where it is spaced from the inside walls of can 130. The outside orifices are on the order of three-sixteenths square inch. A multiplicity of honeycomb pockets are provided which funnel to the tighter weave toward the center tube 138. Approximately 30 layers of cord are wound upon tube 138 between the inner and the outer peripheries thereof.

As oil enters the prefilter sump 30, via connection 144, larger particles become entrained near the exterior of the media 136 and splash or fall toward the bottom of the media around the outer edge thereof in the space between the media and can 130. Smaller particles pass into the honeycombed pockets in the media and become lodged in the pockets with the media removing particles larger than 100 microns. The filtered oil with particles smaller than 100 microns passes through the perforations in tube 138 and upwardly and outwardly through connection 146. This filter may be cleaned and reemployed as desired by unscrewing the can and emptying the larger particles from the bottom of the can. Some cleaning by rinsing can be employed before returning the filter to service. This filter has been found particularly efficacious in preparing the oil for the finer filtering of second stage filters 32. However, certain other filtering elements for removing particles from the oil down to a given size may be alternatively employed such as, for example, a conventional pleated paper cartridge filter.

Figure 6:
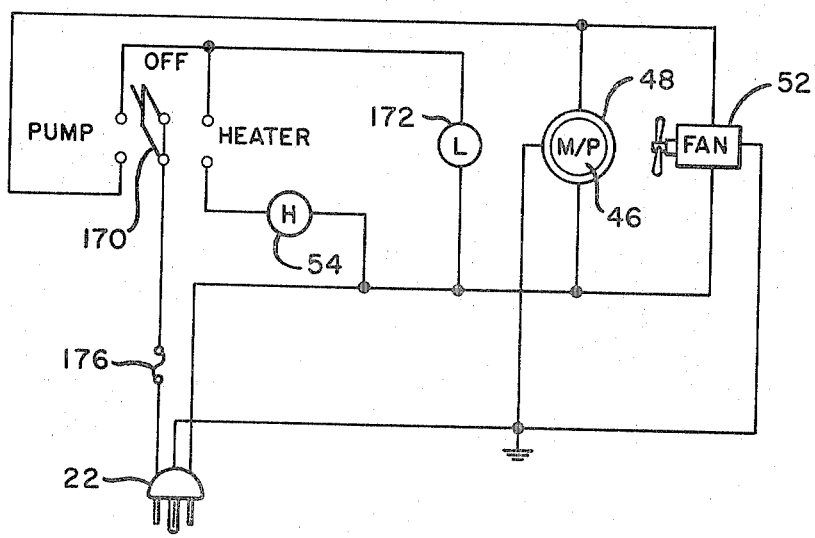
FIG. 6 is a schematic diagram of an electrical circuit for operating the present invention.

Referring now to FIG. 6, comprising an electrical diagram according to the present invention, a double-pole double-throw switch 170 is employed for switching between pump and heater functions. With the switch thrown to the left position, current is conducted through fuse 176 to motor 48 for driving pump 46 and fan motor 52 is operated for cooling the motor 48 and first stage filter 30. If switch 170 is thrown to the right, heating tube 54 is energized for maintaining the temperature of the second stage filters as hereinbefore described, with switch 170 also being provided with a center OFF position. In either the switch position for energizing the pumps and fan, or the switch position for energizing the heater, a pilot lamp 172 is also energized.

Considering the general operation of the filtering system according to the present invention, the heated cooking oil from tank 34 is continuously circulated through prefilter sump 30, pump 46, and second stage filters 32, and returned to the tank, with the prefilter sump 30 removing food particles and the like down to 100 microns before the hot cooking oil is drawn into pump 46. Pump 46 forces the oil lengthwise, i.e., axially, from bottom to top through the paper filter media 92 of second stage filters 32. Thus, in both the prefilter sump 30, and in the second stage filters 32, the oil is passed through a configuration of interlocking fibers for removing undesired particles. The fibers on the nylon thread of prefilter sump 30 removes the undesired particles down to a predetermined size, while the interlocking fibers between sheets of the multilayer paper rolls in second stage filters 32 remove particles down to an extremely small size, wherein the hot cooking oil as it passes upwardly in second stage filters 32 encounters an enormous number of such fibers as the oil passes axially along the paper convolutions, axially of the paper roll. According to tests performed, the second stage filters remove particles of greater than seven one-hundredths of a micron, and it has been found that filtering is sufficiently effective that in some cases the cooking oil 42 can be utilized almost indefinitely. While the filter sump is accessible internally for cleaning and the like by unscrewing same from its manifold 142, the second stage filters 32 are desirably disposable as a unit and are merely discarded after unscrewing from manifold 86 and replaced with an entirely separate unit.

During operation, the filter media continues to function in the desired fashion for removing particles, but eventually becomes saturated or clogged with the food particles to the degree that the pressure tends to rise in the system. When the system is first operated with new filter media, the oil pressure is on the order of 5 p.s.i., but the oil pressure subsequently and gradually rises as the filtering takes place, and eventually a point is reached where the bypass device of pump 46 operates whereby continous flow in the system becomes curtailed. This bypass arrangement is, of course, very desirable to prevent excessive pressures from occurring in the system, and moreover, it has been found that the filter media, with particular respect to the media 92, functions more successfully when fairly low pressures are maintained. Packing of the media may take place at high pressures, so high pressure operation can impede the correct functioning of the filters.

While only two second stage filters 32 are illustrated in the FIG. 2 system, it is understood that a greater or lesser number may be employed according to the flow requirements in a particular system. Also, while the present system is of particular advantage in connection with the cooking oils and the like, it is understood that other liquids can be similarly filtered in removing or separating very small particles therefrom.

While I have shown and described the preferred embodiment of my invention, it will be apparent to those skilled in the art that many changes and modifications may be made without departing from my invention in its broader aspects. I, therefore, intend the appended claims to cover all such changes and modifications as fall within the true spirit and scope of my invention.

I claim:

1. A filtering system for cooking oil heated to high temperatures in a deep fat cooking vessel, said system comprising:

first and second conduit means for filtering means for cooking oil to and from said cooking vessel, a first filtering means including a first filtering media for receiving said cooking oil from the second of said conduit means and for removing particles from said cooking oil above a predetermined intermediate size by collecting said particles, said first filtering media comprising a cord characterized by a fibrous exterior, said cord being wound in an overlapping weave, a second filtering means for receiving cooking oils as filtered by the first filtering means and in fluid communication therewith, said second filtering means having a filtering media comprising a multilayer roll of thin, fibrous, paper material presenting interlocking fibers between layers, said second filtering means including means for directing said cooking oil axially of said roll substantially along the layers thereof, said second filtering means comprising a cylindrical metal container having a cylindrical sidewall and first and second ends joined to said sidewall at longtitudinally upstanding crimped edges, said container being closed to the flow of fluid to be filtered except for a plurality of perforation means within the first end of said cylindrical container, and fluid inlet connection means proximate said first end and centrally located thereof, said fluid inlet connection means communicating with a central core within said cylindrical container, said core providing fluid communication to a point proximate the second end of said container, the second end of said container having means to support said filtering media within said container and a portion rounded outwardly from inside said longitudinally upstanding crimped edges to provide for the flow of fluid from said point proximate the second end of said container in a radial direction therefrom, and screen means within said container adjacent said first end for support of said filtering media at said first end, said filtering media of said second filtering means being located peripherally around said central core and supported between said means to support said filtering media and said screen means, and a pump pumping fluid into said central fluid inlet connection means and into said central core and to said point proximate the second end of said container whereby said fluid passes radially therefrom and then upwardly through said filtering media and through said perforation means within the first end of said container, and is returned to said cooking vessel by said first conduit means coupling said first and second filtering means with said cooking vessel for return of oil thereto.

2. The system according to claim 1 wherein the weave of the cord of the first filtering media becomes tighter in the direction taken by said cooking oil in passing through said filtering media, to provide a plurality of pocket-like semienclosures for trapping particles from said cooking oil.

3. The system according to claim 2 wherein said cord is wound upon a central core, said core comprising a perforated tube, said first filtering means further including an enclosure for said filter media, and coupling means connecting both to the interior of said enclosure outside said wound cord, and to the interior of said perforated tube, said enclosure being diametrically larger than the body of the wound cord to provide a sump for larger particles.

4. The system according to claim 1 wherein said pump is provided with means for limiting the fluid pressure provided thereby to a given predetermined value.

5. The system according to claim 1 further including a cabinet for housing said pump and said filtering means, and further including heating means for selectively maintaining the temperature of filtering means at least at a predetermined value.

6. The system according to claim 5 further including means for cooling a said filtering means for reducing the temperature of the oil received from said cooking vessel in said filtering means.

7. The apparatus according to claim 1 wherein said pump is disposed between said first filtering means and said second filtering means.

8. The apparatus according to claim 7 wherein said second filtering means comprises a plurality of filters connected in parallel, each said filter comprising a container for enclosing a roll of said paper material.

9. The system according to claim 1 wherein said second filtering means comprises a cylindrical container enclosing said roll of paper material, said container including a central metal core having a threaded connection thereon on one end proximate to said first end of said container, and about which said roll of paper material is disposed within said container, said core extending longitudinally within said container from said threaded connection to a point proximate said second end thereof, said second filtering means further comprising a manifold having a mating threaded connection for engaging the first mentioned threaded connection for providing a fluid connection to the interior of said central core, said manifold further having fluid connection means for communicating with said container outside said central core.

10. The apparatus according to claim 9 further including screen means disposed between said roll of paper material and said first end of said container, said first end of said container being perforated for providing communication of fluid to the interior of said manifold outside said mating threaded connection.

* * * * *